United States Patent [19]
Inoue

[11] Patent Number: 5,779,930
[45] Date of Patent: Jul. 14, 1998

[54] FERRITE CORE FOR LINE FILTERS

[75] Inventor: Shoji Inoue, Chiba, Japan

[73] Assignee: TDK Corporation, Tokyo, Japan

[21] Appl. No.: 820,887

[22] Filed: Mar. 21, 1997

[30] Foreign Application Priority Data

Mar. 22, 1996 [JP] Japan ................................. 8-093206

[51] Int. Cl.$^6$ ............................................. H01F 1/34
[52] U.S. Cl. .......................... 252/62.62; 252/62.59; 252/62.63
[58] Field of Search ........................... 252/62.59, 62.62, 252/62.63

[56] References Cited

U.S. PATENT DOCUMENTS 5,498,361  3/1996  Matsukawa et al. .............. 252/62.62

FOREIGN PATENT DOCUMENTS

| 0 551 907 | 7/1993 | European Pat. Off. . |
| 3-41708 | 2/1991 | Japan . |
| 5-74623 | 3/1993 | Japan . |
| 6-204025 | 7/1994 | Japan . |

OTHER PUBLICATIONS

H. Inaba, et al., "Magnetic Properties and the Grain Boundary Structure of Mn–Zn Ferrites with the Additional of Nb2O5," *Journal of Magnetism and Magnetic Materials*, vol. 133, No. 1/03, 1 May 1994, pp. 487–489.

*Primary Examiner*—Melissa Bonner
*Attorney, Agent, or Firm*—Oblon, Spivak, McClelland, Maier & Neustadt, P.C.

[57] ABSTRACT

A ferrite core for line filters according to the invention comprises, as main components, manganese oxide in an amount of 13.5 to 16% by weight, calculated as MnO and zinc oxide in an amount of 14 to 16% by weight calculated as ZnO with the rest being iron oxide, and as subordinate components, silicon oxide in an amount of 50 to 200 ppm calculated as $SiO_2$, calcium oxide in an amount of 100 to 350 ppm calculated as CaO, niobium oxide in an amount of 30 to 150 ppm calculated as $Nb_2O_5$, molybdenum oxide in an amount of 20 to 300 ppm calculated as $MoO_3$, and bismuth oxide in an amount of 100 to 800 ppm calculated as $Bi_2O_3$. Such a core has high inductance at about 1 kHz and high impedance at about 500 kHz, and shows a high noise reduction coefficient over a wide frequency band.

8 Claims, 1 Drawing Sheet

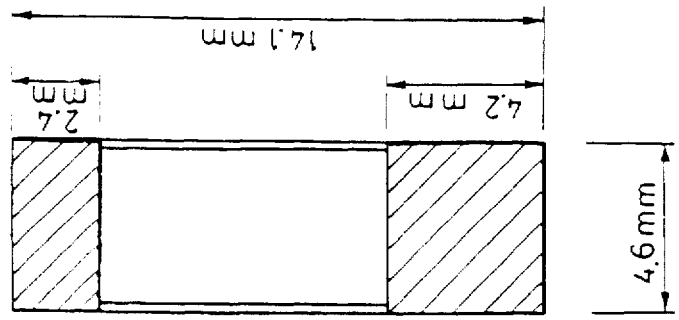
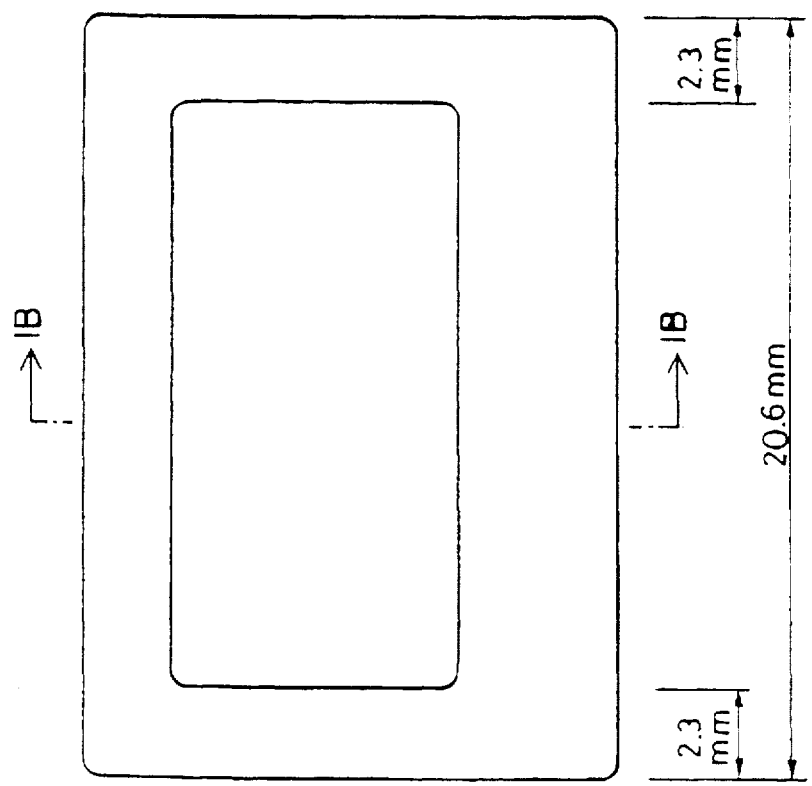

FERRITE CORE FOR LINE FILTERS

FIELD OF THE INVENTION

The present invention relates to a ferrite core for line filters which has high permeability with an improvement in its frequency dependence, and a high noise reduction coefficient over a wide frequency band.

BACKGROUND OF THE INVENTION

Ferrite cores for line filters are required to have high permeability at a relatively high Frequency as well as over a wide frequency band (of about 0.5 to about 1,000 kHz). A typical manganese-zinc system ferrite having high permeability over such a wide frequency band is disclosed in JP-A-6-204025 (which teaches the addition of bismuth and molybdenum, and shows an initial permeability of at least 9,000 at 100 kHz, and at least 3,000 at 500 kHz). JP-A-5-74623, too, discloses a high-permeability manganese-zinc system ferrite (with molybdenum added thereto).

The ferrite cores for line filters are required to have, in addition to permeability, high inductance in a low frequency region, e.g., at 1 kHz, and high impedance in a high frequency region, e.g., at 500 kHz. With conventional high-permeability materials, however, it is impossible to make any reasonable compromise between both requirements.

Referring then to the manganese-zinc system ferrite core with molybdenum added thereto, the proportion of molybdenum to be incorporated in the starting feed need be higher than designed, because of the necessity of taking account of the amount of sublimable or evaporable molybdenum which will be lost especially upon fired. However, actual mass production of cores with an excessive amount of molybdenum added thereto has revealed that there are significant performance differences between individual cores; that is, low- and high-permeability cores are produced in a mixed up state.

To prevent degradation of magnetic properties due to the evaporation of zinc, it has been proposed to use a case having the same composition as that of a fired compact or co-fire a compacted form of zinc oxide, as typically set forth in JP-A-3-41708. However, such methods cost much.

DISCLOSURE OF THE INVENTION

An object of the present invention is to provide a ferrite core for line filters which has high permeability with an improvement in its frequency dependence, high inductance in low frequency regions, and high impedance in high frequency regions, so that high noise reduction are achievable with little, if any, performance variation.

This and other objects are achieved by the present invention which is defined below as (1) to (8).

(1) A ferrite core for line filters, which comprises manganese oxide, zinc oxide, and iron oxide as main components, and silicon oxide, calcium oxide, niobium oxide, molybdenum oxide, and bismuth oxide as subordinate components, and in which in the main components, a content of manganese oxide is 13.5 to 16% by weight, and a content of zinc oxide is 14 to 16% by weight with the rest being iron oxide, and a weight proportion of the subordinate components based on the main components is such that silicon oxide is 50 to 200 ppm calculated as $SiO_2$, calcium oxide is 100 to 350 ppm calculated as CaO, niobium oxide is 30 to 150 ppm calculated as $Nb_2O_5$, molybdenum oxide is 20 to 200 ppm calculated as $MoO_3$, and bismuth oxide is 100 to 800 ppm calculated as $Bi_2O_3$ (2) The ferrite core of (1), wherein a ratio of CaO to $MoO_3$ is 0.5 to 15.

(3) The ferrite core of (2), wherein the ratio of CaO to $MoO_3$ is 3 to 8.

(4) The ferrite core of (1), which is obtained by compacting, and firing a mixture of a main component feed with a subordinate component feed, and in which the subordinate component feed comprises, based on the main component feed, a silicon oxide material in an amount of 50 to 200 ppm calculated as $SiO_2$, a calcium oxide material in an amount of 100 to 350 ppm calculated as CaO, a niobium oxide material in an amount of 50 to 250 ppm calculated as $Nb_2O_5$, a molybdenum oxide material in an amount of 100 to 400 ppm calculated as $MoO_3$, and a bismuth oxide material in an amount of 100 to 800 ppm calculated as $Bi_2O_3$, and a ratio of CaO to $MoO_3$ in the subordinate component feed is 0.6 to 1.6.

(5) The ferrite core of (1), which has a permeability of at least 10,000 at 100 kHz, and at least 3,000 at 500 kHz.

(6) A ferrite core for line filters, which is obtained by compacting, and firing a mixture of a main component feed with a subordinate component feed, and in which the main component feed comprises a manganese oxide material in an amount of 10 to 20% by weight calculated as MnO, and a zinc oxide material in an amount of 10 to 20% by weight calculated as ZnO with the rest being an iron oxide material, the subordinate component feed comprises, based on the main component feed, a silicon oxide material in an amount of 50 to 200 ppm calculated as $SiO_2$, a calcium oxide material in an amount of 100 to 350 ppm calculated as CaO, a niobium oxide material in an amount of 50 to 250 ppm calculated as $Nb_2O_5$, a molybdenum oxide material in an amount of 100 to 400 ppm calculated as $MoO_3$, and a bismuth oxide material in an amount of 100 to 800 ppm calculated as $Bi_2O_3$, and a ratio of CaO to $MoO_3$ in the subordinate component feed is 0.6 to 1.6.

(7) The ferrite core of (6), which is obtained by firing of a plurality of compacts placed on a setter.

(8) The ferrite core of (6), which has a permeability of at least 10,000 at 100 kHz, and at least 3,000 at 500 kHz.

EFFECT AND ADVANTAGES OF THE INVENTION

The ferrite core for line filters according to the present invention, because of containing as additives predetermined amounts of silicon oxide, calcium oxide, niobium oxide, molybdenum oxide, and bismuth oxide, has high permeability with an improvement in its frequency dependence especially at frequencies of 100 to 500 kHz, and exhibits high impedance at frequencies of 100 to 500 kHz and high inductance at 0.5 to 100 kHz. When applied to line filters operating at frequencies of about 0.5 to about 1,000 kHz, therefore, the ferrite core of the invention shows good-enough noise reduction performance, and can be reduced in terms of size and the number of turns.

Furthermore, the present invention enables ferrite cores to be mass-produced while their characteristic variations, especially their variations in permeability and its frequency dependence can be reduced.

Manganese-zinc ferrite cores may be mass-produced by firing a number of compacts placed on a setter in a pusher furnace. At this time, the cores vary in characteristics depending on where on the setter the compacts are positioned. This characteristic difference is attributable to core composition, especially the content of molybdenum. More specifically, in some compacts positioned in the vicinity of the center of a compact group placed on one setter the Amount of sublimation or evaporation of molybdenum is small, while in some compacts positioned on or around the surface of the compact group the amount of sublimation or evaporation of molybdenum becomes large. This result is reflected on the core composition.

Based on such findings, the inventors have carried out experiments over and over. As a result, the inventors have found that the amount of sublimation or evaporation of molybdenum correlates with the amount of calcium in a compact; that is, the sublimation or evaporation of molybdenum is minimized by limiting the ratio of the amount of calcium to the amount of molybdenum in a starting feed to a specific range, so that the amount of molybdenum can be kept in a specific range, thereby improving noise reduction performance over a wide frequency band. This in turn makes it possible to minimize the sublimation or evaporation of molybdenum in compacts positions on or around the surface of a compact group on the setter, thereby minimizing characteristic variations due to where on the setter the compacts are located, especially variations in permeability and its frequency dependence. According to the present invention capable of minimizing the sublimation or evaporation of molybdenum, it is also possible to prevent a compositional variation of one core between the vicinity of its center and the vicinity of its surface.

Since the temperature at which $MoO_3$ has a vapor pressure of 0.1 atm is as low as about 1,200° C., it appears that the amount of $MoO_3$ sublimed or evaporated during ferrite firing becomes large. From this, it is believed that even with compounds other than molybdenum oxide and having a high vapor pressure at or around the firing temperature for ferrite, characteristic variations can again be minimized by control of the ratio of the amount of calcium oxide to their amount, as is the case with molybdenum oxide.

The examples of JP-A-6-204025, mentioned above, teach the addition of $SiO_2$, CaO, $Si_2O_3$ and $MoO_3$, but make no reference to the addition Of $Nb_2O_5$. Nor is the ratio of CaO to $MoO_3$ referred to therein. According to the teachings of this publication, it is thus impossible to achieve stable provision of invariable ferrite cores which have high permeability with an improvement in its frequency dependence, high inductance at low frequencies, and high impedance at high frequencies.

BRIEF DESCRIPTION OF THE DRAWING

FIG. 1 is a schematic showing one exemplary core shape for measuring impedance, and inductance.

BEST MODE FOR CARRYING THE INVENTION INTO EFFECT

Illustrative constructions of the present invention will now be explained at great length.

The ferrite core for line filters according to the present invention may be produced by compacting, and firing a mixture of a main component feed with a subordinate component feed. The main component feed used comprises 13.5 to 16% by weight calculated as MnO of a manganese oxide material, and 14 to 16% by weight calculated as ZnO of a zinc oxide material, with the rest being an iron oxide material. When the composition of the main component feed departs from the range mentioned above, no high permeability is achievable.

For the main component feed use may be made of ordinary iron oxide materials, manganese oxide materials, and zinc oxide materials, i.e., oxides, and compounds converted by firing to oxides.

The subordinate component feed contains a silicon oxide material, a calcium oxide material, a niobium oxide material, a molybdenum oxide material, and a bismuth oxide material. For these materials use may be made of oxides of the respective metals, or compounds of the respective metals which are converted by firing to oxides. However, it is preferable to use $SiO_2$ as the silicon oxide material, $CaCO_3$ as the calcium oxide material, $Nb_2O_5$ as the niobium oxide material, $Bi_2O_3$ as the bismuth oxide material, and $MoO_3$ as the molybdenum oxide material.

The content of the silicon oxide material is 50 to 200 ppn calculated as $SiO_2$. Too little silicon oxide results in a permeability drop, whereas too much gives rise to abnormal grain growth during firing, resulting again in a permeability drop. In either case, any desired impedance and inductance are not obtainable.

The content of the calcium oxide material is 100 to 350 ppm calculated as CaO. Too little calcium oxide results in a lowering of permeability at a high frequency of about 500 kHz, whereas too much gives rise to a lowering of permeability at an intermediate frequency of about 100 kHz. In either case, any desired impedance and inductance are not obtainable.

The content of the niobium oxide material is 50 to 250 ppm calculated as $Nb_2O_5$. Too little or too much niobium oxide gives rise to a permeability drop; in either case, any desired impedance and inductance are not obtainable.

The content of the molybdenum oxide material is 100 to 400 ppm calculated as $MoO_3$. Too little molybdenum oxide brings about abnormal grain growth during firing, ending up in a permeability drop, whereas too much leads to an increase in the amount of molybdenum sublimed or evaporated during firing and, hence, a significant characteristic variation between cores obtained by the co-firing of a number of compacts. In either case, any desired impedance and inductance are not obtainable.

The content of the bismuth oxide material is 100 to 800 ppm calculated as $Bi_2O_3$. Too little or too much bismuth oxide results in a permeability drop; in either case, any desired impedance and inductance are not obtainable.

It is here to be noted that the contents of the subordinate component materials are given in ppm unit with respect to the main component feed.

The ratio of calcium oxide to molybdenum oxide in the subordinate component feed is 0.6 to 1.6, and preferably 0.7 to 1.5, calculated as $CaO/MoO_3$. At too low a ratio, the amount of molybdenum sublimed or evaporated during firing increases, resulting in a significant characteristic variation between cores obtained by the co-firing of a number of compacts, especially a significant variation in permeability, and its frequency dependence. Too high a ratio, on the other hand, gives rise to a permeability drop at a low frequency of about 100 kHz. In either case, any desired impedance and inductance are not obtainable.

It is here to be understood that the ferrite core of the present invention may contain, in addition to the aforesaid subordinate components, at least one member of oxides such as indium oxide, vanadium oxide, and tantalum oxide. Preferably in this case, these oxides are present in a total amount of 0 to about 3,000 ppm when calculated as $In_2O_3$, $V_2O_5$, and $Ta_2O_5$, respectively.

First, the aforesaid main component feed is calcined at about 850° to about 950° C. for about 5 minutes to 2 hours. The calcination may be carried out by spray calcination. The subordinate component feed is then added to, and mixed with the obtained calcined body by pulverization. Calcium oxide and silicon dioxide or their source compounds may be added to the main component feed before and/or after calcination. The mixture is finally granulated with a small amount, e.g., 0.1 to 1.0% by weight of a suitable binder such as polyvinyl alcohol added thereto, using a spray dryer or the like, thereby obtaining granules of about 80 to about 200 μm in size, which are in turn compacted.

The obtained compact is then fired. For this firing, for instance, the compact is slowly heated to a target sintering temperature at a heating rate of about 50° to 300° C./hour in an atmosphere having a controlled oxygen concentration. Then, sintering is finished by holding the compact at a given temperature of usually at least 1,250° C., especially 1,300° to 1400° C. for about 4 to about 5 hours. After the completion of sintering, the product is preferably cooled down at a cooling rate of about 50° to about 300° C./hour in an atmosphere with its oxygen concentration placed under control.

When such firing is effected, it is desired that the partial pressure of oxygen be kept at preferably at least 25%, more preferably at least 30%, and most preferably 30 to 100% from at least the heating step of 1,000° C. or higher to the temperature holding step, and more preferably in a temperature range of at least 1,000° C. In general, a longer holding period of time may be used at a higher firing temperature so that crystal grains having a relatively large size are obtained to achieve high permeability. However, the higher and longer the firing temperature and time, the shorter the service life of a firing furnace, or the lower the productivity. In a combined bismuth oxide, molybdenum oxide and niobium oxide composition system, however, oxygen firing such as one mentioned above makes it possible to improve permeability at 100 to 500 kHz even when firing occurs at a relatively low temperature for a relatively short time, so that both inductance in a low frequency region and impedance in a high frequency region can be improved. Low-temperature and short-time firing also enables the sublimation or evaporation of molybdenum and bismuth to be so minimized that permeability variations can be much more reduced.

Usually, firing may be carried out in a pusher furnace, which enables continuous firing to be carried out by the continuous introduction therein of setters with a plurality of compacts placed thereon. Setter size is not critical, but is usually about 250 to about 300 mm in length per side. About 50 to about 500 compacts per stage may be placed on one setter, although depending on setter size or compact size. One setter may be made up of 1 to 8 stages, and so may have a total of about 50 to about 2,400 compacts or a total load of about 2 to about 6 kg placed thereon. Even when, according to the present invention, such numerous compacts are placed on the setter for firing purposes, it is possible to minimize compositional variations which may otherwise be caused by position variations of compacts on the setter.

The aforesaid starting feeds usually provide the following (core) composition upon fired. The main component feed contains 13.5 to 16% by weight calculated as MnO of manganese oxide, and 14 to 16% by weight calculated as ZnO of zinc oxide with the rest being iron oxide. The subordinate component feed contains 50 to 200 ppm calculated as $SiO_2$ of silicon oxide, 100 to 350 ppm calculated as CaO of calcium oxide, 30 to 150 ppm calculated as $Nb_2O_5$ of niobium oxide, 20 to 200 ppm, preferably 20 to 100 ppm, calculated as $MoO_3$ of molybdenum oxide, and 100 to 800 ppm calculated as $Bi_2O_3$ of bismuth oxide. Such composition enables both inductance in a low frequency region, e.g., at about 1 kHz and impedance in a high frequency region, e.g., at about 500 kHz to have high values, so that noise reduction can be effectively achieved over a wide frequency band. In some cases, the amount of the subordinate components in the core is larger than that of the subordinate component feed added for the reason that the elements forming the subordinate components, especially Si and Ca have often been contained as impurities in the main component feed. In some cases, on the other hand, the amount of the subordinate components in the core is smaller than that of the subordinate component feed added for the reason that the elements forming the subordinate components, especially Mo and Nb are often lost by sublimation or evaporation during firing.

It is here to be understood that the ratio of $CaO/MoO_3$ in the core composition is preferably 0.5 to 15, and more especially 3 to 8.

The ferrite core of the present invention has preferably a mean grain size of 5 to 50 μm. Too large or too small a mean grain size causes the high-frequency dependence of μi to drop. It is here to be noted that the mean crystal grain size may be found by etching mirror-polished surfaces of polycrystal samples with an acid, and observing them under an optical microscope to average sample diameters upon calculated as circles.

According to the present invention, ferrite cores may be produced by the co-firing of a multiplicity of compacts placed on the setter as mentioned above. Even in this case, it is easy to achieve an initial permeability of at least 10,000, possibly 11,000 or more or even possibly 12,000 at 100 kHz. It is also easy to achieve an initial permeability of at least 3,000, possibly 3,500 or more at 500 kHz.

EXAMPLE

Examples of the present invention are given below by way of illustration.

Example 1

A main component feed comprising MnO (14.3% by weight) and ZnO (15.4% by weight) with the rest being $Fe_2O_3$ was mixed with a subordinate component feed comprising $SiO_2$ (50 ppm), $Bi_2O_3$ (300 ppm), $Nb_2O_5$, $MoO_3$ and $CaCO_3$. Set out in Table I are the amounts of $Nb_2O_5$, $MoO_3$ and $CaCO_3$ (calculated as CaO) added as well as the ratios of the amount of $CaCO_3$ (calculated as CaO) added to the amount of $MoO_3$ added.

Specifically, the main component materials $Mn_3O_4$, ZnO and $Fe_2O_3$ were mixed into a mixture which was then calcined at 900° C. for 30 minutes. The subordinate component feed was added to the obtained calcined body at the proportions set out in Table 1, and mixed therewith by pulverization.

This pulverized mixture was added with a binder to a mean particle size of 150 μm by means of a spray dryer, and compacted. Then, the compact was heated in an atmosphere having a controlled partial oxygen pressure, and held at 1,350° C. for 4 hours for sintering. Thereafter, the sintered compact was cooled in an atmosphere having a controlled partial oxygen pressure to obtain a core sample having such shape as illustrated in FIG. 1. Length is given in mm unit. For firing, a pusher furnace was used. Five hundred and forty (540) compacts were loaded per one setter. The loading pattern used was one stage.

Each core sample was measured for its average composition by means of fluorescence x-rays, and for its Si (calculated as $SiO_2$), Nb (as $Nb_2O_5$), Bi (as $Bi_2O_3$), Mo (as $MoO_3$), and Ca (as CaO) contents.

It is here to be noted that the compositional ratio of the main components of the core was equivalent to that of the main component feed Each core sample was measured for its inductance L at 1 kHz and its impedance |Z| at 500 kHz under the following conditions:

Current: 0.5 mA

Number of turns: 10 turns

Temperature: 23° C.

The results are shown in Table 1.

a higher calcium content is improved in terms of impedance at 500 kHz, but has an extremely low inductance at 1 kHz. Core sample Nos. 1–7 were actually used for common mode choke coils of line filters. As a result, it was found that invented core sample Nos. 1–3 have much higher effect on noise reductions at 0.5 to 1,000 kHz, as compared with comparative core sample Nos. 4–7.

Example 2

A main component feed comprising MnO (14.3% by weight) and ZnO (15.4% by weight) with the rest being $Fe_2O_3$ was mixed with a subordinate component feed comprising $SiO_2$; (50 ppm), $Bi_2O_3$ (300 ppm), $Nb_2O5$, $MoO_3$ and $CaCO_3$. Set out in Table 2 are the amounts of $Nb_2O_5$, $MoO_3$ and $CaCO_3$ (calculated as CaO) added as well as the ratios of the amount of $CaCO_3$ (calculated as CaO) added to the amount of $MoO_3$ added.

Specifically, the main component materials $Mn_3O_4$, ZnO and $Fe_2O_3$ were mixed into a mixture which was then calcined at 900° C. for 30 minutes. The subordinate component feed was added to the obtained calcined body at the proportions set out in Table 2, and mixed therewith by pulverization

TABLE 1

| Sample No. | Feed Composition | | | | | |
|---|---|---|---|---|---|---|
| | $SiO_2$ (ppm) | $Bi_2O_3$ (ppm) | $Nb_2O_5$ (ppm) | $MoO_3$ (ppm) | CaO (ppm) | $CaO/MoO_3$ |
| 1 | 30 | 500 | 100 | 300 | 200 | 0.67 |
| 2 | 30 | 400 | 50 | 300 | 200 | 0.67 |
| 3 | 50 | 300 | 100 | 200 | 200 | 1.00 |
| 4 (comp.) | 50 | 300 | 100 | 200 | 100 | 0.5* |
| 5 (comp.) | 50 | 300 | 100 | 200 | 350 | 1.75* |
| 6 (comp.) | 50 | 300 | 0* | 200 | 200 | 1.00 |
| 7 (comp.) | 50 | 300 | 100 | 200 | 0* | 0* |

| Sample No. | Core Composition | | | | | | 1 kHz L | | 500 kHz Z | |
|---|---|---|---|---|---|---|---|---|---|---|
| | $SiO_2$ (ppm) | $Bi_2O_3$ (ppm) | $Nb_2O_5$ (ppm) | $MoO_3$ (ppm) | CaO (ppm) | $CaO/MoO_3$ | μm | Rel** | Ω | Rel.** |
| 1 | 69 | 287 | 68 | 32 | 190 | 5.94 | 290 | 1.36 | 673 | 1.54 |
| 2 | 86 | 320 | 43 | 41 | 204 | 4.98 | 294 | 1.37 | 650 | 1.48 |
| 3 | 109 | 243 | 80 | 32 | 176 | 5.50 | 275 | 1.29 | 682 | 1.56 |
| 4 (comp) | 107 | 246 | 77 | 29 | 68* | 2.34 | 279 | 1.30 | 485 | 1.11 |
| 5 (comp) | 113 | 237 | 85 | 35 | 382* | 10.91 | 214 | 1 | 715 | 1.63 |
| 6 (comp) | 102 | 240 | 0* | 31 | 186 | 6.00 | 220 | 1.03 | 452 | 1.03 |
| 7 (comp) | 109 | 239 | 74 | 28 | 18* | 0.64 | 264 | 1.13 | 438 | 1 |

*Outside the range of the invention
**Relative value
Si 110–130
Nb 80–120
Bi 250–300

From the results shown in Table 1, it is found that core sample Nos. 1–3 of the present invention show an about 30% increase in inductance at 1 kHz over the lowest level of the comparative samples and an about 50% increase in impedance at 500 kHz over the lowest level of the comparative samples; they have extremely high values for both inductance at 1 kHz and impedance at 500 kHz. However, the samples with neither niobium nor calcium added thereto are very low in both inductance at 1 kHz and impedance at 500 kHz. Sample No. 4 having a lower calcium content shows good inductance at 1 kHz, but has an extremely low impedance at 500 kHz. On the contrary, sample No. 5 having This pulverized mixture was added with a binder to a mean particle size of 150 μm by means of a spray dryer, and compacted. Then, the compact was heated in an atmosphere having a controlled partial oxygen pressure, and held at 1,350° C. for 4 hours for sintering. Thereafter, the sintered compact was cooled in an atmosphere having a controlled partial oxygen pressure to obtain a toroidal core sample of 31 mm in outer diameter, 19 mm in inner diameter and 8 mm in height. For firing, a pusher furnace was used. Three hundred and forty-three (343) compacts were loaded per one setter. The loading pattern used was seven stages each having 7×7 compacts loaded thereon.

The composition of each core sample was measured by means of fluorescence x-rays. Inner, and outer cores were measured for their molybdenum (calculated as $MoO_3$), and calcium (as CaO) contents, respectively. The ratio of the molybdenum content of the inner cores to that of the outer cores was calculated as well. These results are shown in Table 2 in which the "inner core" refers to cores corresponding to compacts located at a central region of a compact group placed on the setter, and the "outer core" to cores corresponding to compacts located on the outermost side of the compact group.

It is here to be noted that the compositional ratio of the main components of each core was equivalent to that of the main component feed with a silicon content of 100 to 130 ppm calculated as $SiO_2$, a niobium content of 80 to 120 ppm calculated as $Nb_2O_5$, and a bismuth content of 250 to 300 ppm calculated as $Bi_2O_3$.

Each core sample was measured for its initial permeability µi at 100 kHz and 500 kHz (both at 25° C.). The results are shown in Table 2. Values of the "outer-inner" in Table 2 were obtained by $$100 \times \{(\mu i \text{ of outer core}) - (\mu i \text{ of inner core})\}/\mu i \text{ of inner core}$$

The initial permeability was measured using an LCR meter.

calcium added thereto, there is a relatively small µi difference between the inner and outer cores because of a considerable decrease in the amount of $MoO_3$ due to firing. However, the initial permeability µi itself drops remarkably. In core sample No. 7 having too large a $CaO/MoO_3$ ratio, there is a drop of permeability at 100 kHz, and in core sample No. 6 with no $Nb_2O_5$ added thereto, the initial permeability µi is low with a large µi difference between the inner and outer cores.

Furthermore in the core samples of the present invention, a compositional difference per core between the vicinity of the surface and the vicinity of the center is small.

The effect of the present invention is evident from the results of the foregoing examples.

I claim:

1. A ferrite core for line filters, which comprises manganese oxide, zinc oxide, and iron oxide as main components, and silicon oxide, calcium oxide, niobium oxide, molybdenum oxide, and bismuth oxide as subordinate components, and in which in the main components, a content of manganese oxide is 13.5 to 16% by weight, and a content of zinc oxide is 14 to 16% by weight with the rest being iron oxide, and a weight proportion of the subordinate components based on the main components is such that

TABLE 2

| | Feed Composition | | | Inner | Core Composition Outer | | | Quant. Ratio of $MoO_3$ | |
|---|---|---|---|---|---|---|---|---|---|
| Sample No. | $Nb_2O_5$ (ppm) | $MoO_3$ (ppm) | CaO (ppm) | $CaO/MoO_3$ | $MoO_3$ (ppm) | CaO (ppm) | $MoO_3$ (ppm) | CaO (ppm) | Inner/ outer core |
| 1 (comp) | 100 | 200 | 0* | 0* | 129 | 70* | 37 | 68* | 3.49 |
| 2 (comp) | 100 | 200 | 75* | 0.38* | 155 | 122 | 60 | 119 | 2.58 |
| 3 (comp) | 100 | 200 | 100 | 0.50* | 158 | 147 | 73 | 139 | 2.16 |
| 4 | 100 | 200 | 150 | 0.75 | 160 | 188 | 102 | 184 | 1.57 |
| 5 | 100 | 200 | 200 | 1.00 | 192 | 239 | 129 | 236 | 1.49 |
| 6 (comp) | 0* | 200 | 200 | 1.00 | 190 | 235 | 130 | 233 | 1.46 |
| 7 (comp) | 100 | 200 | 3 50 | 1.75* | 194 | 386* | 163 | 381* | 1.19 |
| 8 | 100 | 150 | 150 | 1.00 | 138 | 186 | 100 | 181 | 1.38 |
| 9 | 100 | 150 | 200 | 1.33 | 128 | 232 | 103 | 2 34 | 1.24 |

| | µi at 100 kHz | | Outer- | µi at 500 kHz | | Outer- |
|---|---|---|---|---|---|---|
| Sample No. | Inner core | Outer core | Inner | Inner core | Outer core | Inner |
| 1 (comp) | 8210 | 8500 | 3.5% | 2060 | 2100 | 1.9% |
| 2 (comp) | 8570 | 10470 | 22.2% | 2190 | 2520 | 15.1% |
| 3 (comp) | 8940 | 11170 | 26.2% | 2330 | 2590 | 11.2% |
| 4 | 10440 | 11180 | 7.1% | 3050 | 3160 | 3.6% |
| 5 | 10610 | 10810 | 1.9% | 3230 | 3400 | 5.3% |
| 6 (comp) | 8920 | 9800 | 9.9% | 1980 | 2300 | 16.2% |
| 7 (comp) | 9830 | 9540 | -3.0% | 3920 | 4310 | 9.9% |
| 8 | 10740 | 10910 | 1.6% | 3170 | 3340 | 5.4% |
| 9 | 10590 | 10420 | -1.6% | 3540 | 3750 | 5.9% |

*Outside of the range of the invention

The results shown in Table 2 clarifies the effect of the present invention, i.e., the effect resulting from the limitation of $CaO/MoO_3$ in the subordinate component feed to a specific range. In other words, the core samples of the present invention, which contains $Nb_2O_5$ in the predetermined amount with the $CaO/MoO_3$ ratio lying within the predetermined range, show high µi at both 100 kHz and 500 kHz, with a small µi difference between the inner and outer cores.

In core sample Nos. 2 and 3 having too small a $CaO/MoO_3$ ratio, however, there is a large µi difference between the inner and outer cores. In core sample No. 1 with no silicon oxide is 50 to 200 ppm calculated as $SiO_2$, calcium oxide is 100 to 350 ppm calculated as Cao, niobium oxide is 30 to 150 ppm calculated as $Nb_2O_5$, molybdenum oxide is 20 to 200 ppm calculated as $MoO_3$, and bismuth oxide is 100 to 800 ppm calculated as $Bi_2O_3$.

2. The ferrite core of claim 1, wherein a ratio of CaO to $MoO_3$ is 0.5 to 15.

3. The ferrite core of claim 2, wherein the ratio of CaO to $MoO_3$ is 3 to 8.

4. The ferrite core of claim 1, which is obtained by compacting, and firing a mixture of a main component feed with a subordinate component feed, and in which the subordinate component feed comprises, based on the main component feed, a silicon oxide material in an amount of 50 to 200 ppm calculated as $SiO_2$, a calcium oxide material in an amount of 100 to 350 ppm calculated as CaO, a niobium oxide material in an amount of 50 to 250 ppm calculated as $Nb_2O_5$, a molybdenum oxide material in an amount of 100 to 400 ppm calculated as $MoO_3$, and a bismuth oxide material in an amount of 100 to 800 ppm calculated as $Bi_2O3$, and a ratio of CaO to $MoO_3$ in the subordinate component feed is 0.6 to 1.6.

5. The ferrite core of claim 1, which has a permeability of at least 10,000 at 100 kHz, and at least 3,000 at 500 kHz.

6. A ferrite core for line filters, which is obtained by compacting, and firing a mixture of a main component feed with a subordinate component feed, and in which the main component feed comprises a manganese oxide material in an amount of 10 to 20% by weight calculated as MnO, and a zinc oxide material in an amount of 10 to 20% by weight calculated as ZnO with the rest being an iron oxide material, the subordinate component feed comprises, based on the main component feed, a silicon oxide material in an amount of 50 to 200 ppm calculated as $SiO_2$, a calcium oxide material in an amount of 100 to 350 ppm calculated as CaO, a niobium oxide material in an amount of 50 to 250 ppm calculated as $Nb_2O_5$, a molybdenum oxide material in an amount of 100 to 400 ppm calculated as $MoO_3$, and a bismuth oxide material in an amount of 100 to 800 ppm calculated as $Bi_2O_3$, and a ratio of Cao to $MoO_3$ in the subordinate component feed is 0.6 to 1.6.

7. The ferrite core of claim 6, which is obtained by firing of a plurality of compacts placed on a setter.

8. The ferrite core of claim 6, which has a permeability of at least 10,000 at 100 kHz, and at least 3,000 at 500 kHz.

\* \* \* \* \*

UNITED STATES PATENT AND TRADEMARK OFFICE
CERTIFICATE OF CORRECTION

PATENT NO. : 5,779,930

DATED : July 14, 1998

INVENTOR(S) : Shoji Inoue

It is certified that error appears in the above-identified patent and that said Letters Patent is hereby corrected as shown below:

Column 11, line 12, change "Bi$_2$O3" to --Bi$_2$O$_3$--.

Column 12, line 13, change "Cao" to --CaO--.

Signed and Sealed this

Third Day of April, 2001

Attest:

NICHOLAS P. GODICI

Attesting Officer

Acting Director of the United States Patent and Trademark Office